Aug. 29, 1972   E. A. WANGBORG   3,687,773
METHOD OF MAKING A FLOORING UNIT
Filed June 12, 1970

INVENTOR
ERIC ADOLF WANGBORG
By
Diller, Brown, Ramik & Hart
ATTORNEYS

United States Patent Office 3,687,773
Patented Aug. 29, 1972

3,687,773
METHOD OF MAKING A FLOORING UNIT
Eric Adolf Wangborg, Pl 4330, Edsbyn, Sweden
Filed June 12, 1970, Ser. No. 45,830
Int. Cl. B32b *31/18*
U.S. Cl. 156—265           3 Claims

ABSTRACT OF THE DISCLOSURE

This disclosure relates to a composite flooring wherein each flooring element is made up of at least two boards with each board being tapered and with the wide end of one board being disposed adjacent the narrow end of the next adjacent board, and wherein the boards may be reinforced by underlying boards disposed at right angles to the first boards, only the exposed boards being the wearing boards of the flooring.

---

The present invention is related to a flooring unit and a method for making the flooring unit.

One of the most usual floorings of present time consists of so called parquetry. This may as an example be formed of blocks in the form of short blocks or long blocks or built up of laminar boards consisting of a supporting layer of for example soft wood having a wearing layer of leafwood glued thereto. The advantages in floors formed of such units are supposed to be that they are comparably comfortable to walk on and non-slippery and that they have good wearing quality. The floors in question are, however, subject to a plurality of substantial disadvantages. Thus, the material consumption in each unit produced is very great, since owing to production technique a considerable wastage occurs counting from tree-trunk to the finished product. Further the very method for manufacturing the units is complicated and uneconomical due to the fact that the same requires a plurality of steps. Additionally the latent aesthetical values of a naturally grown tree-trunk are spoiled in the hitherto used production technique.

Object of this invention is primarily a flooring unit wherein the above-mentioned disadvantages have been removed partially or fully. A main feature of the new flooring unit is that it includes boards having a contour form more or less conical or tapering from one end to the other, and that the narrow end of the board is disposed adjacent the board end of at least one adjacent board.

A further object of the invention is a method for preparing flooring units of the kind defined above. The characteristics of the method are to be found in the appended patents claims.

With reference to the accompanying drawing a detailed description of a preferred embodiment of the flooring unit, selected as an example will now follow.

Figure 1:
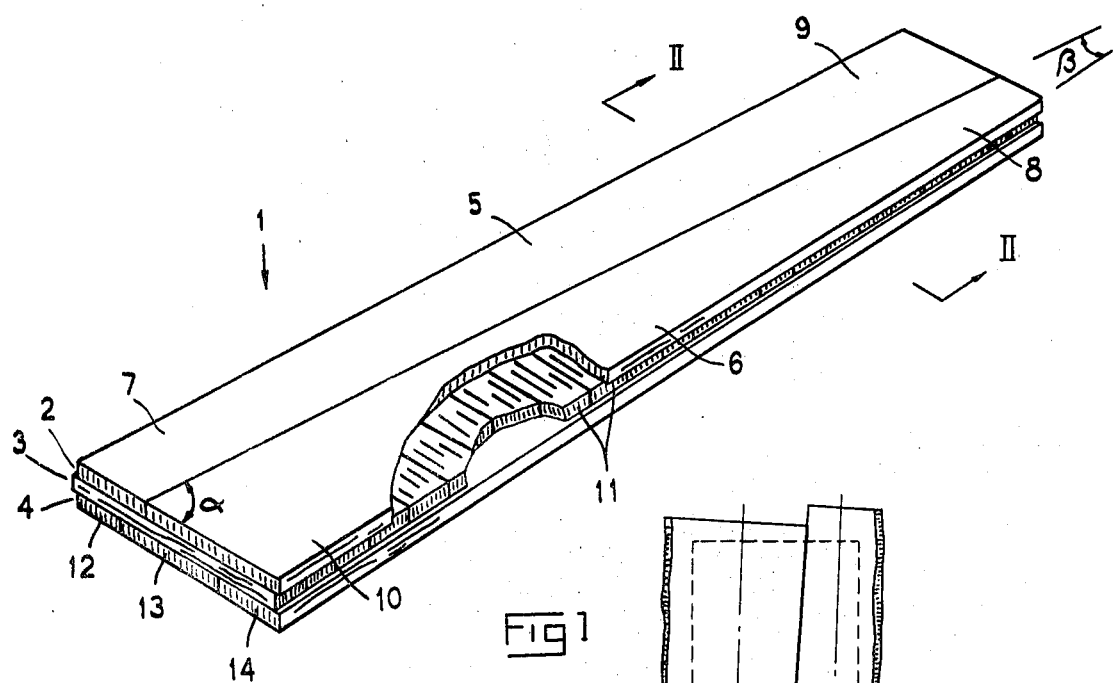
Figure 2:
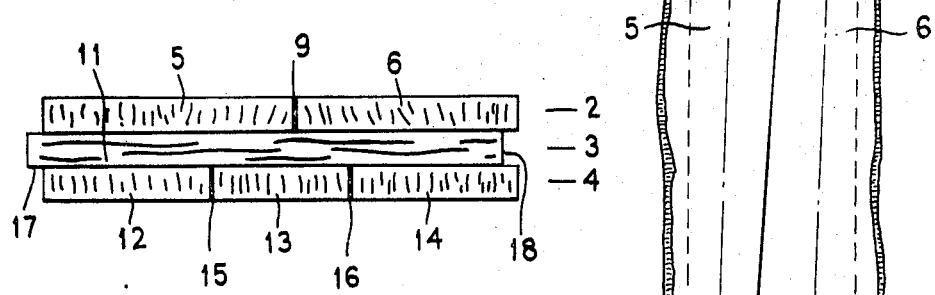
Figure 3:
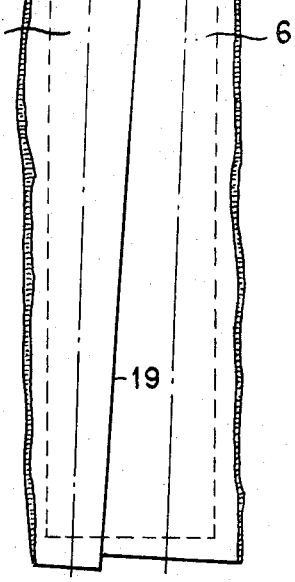

FIG. 1 represents a perspective view of a flooring unit, FIG. 2 a sectional view II—II in FIG. 1 and FIG. 3 a plan view of a portion of the flooring unit in a particular phase of the production.

In FIG. 1 the inventional flooring unit is generally designated by 1. In the embodiment shown the flooring unit is laminated, and to this end the same includes a wearing layer 2, a second laminar layer 3 and a third laminar layer 4. The wearing layer 2 which in its use position faces upwardly is in this case composed of two boards 5 and 6, which are each in accordance with the idea of the invention formed with, on one hand, a narrow end 7 and 8 respectively and, on the other, a wide end 9 and 10 respectively, the narrow end 7 of the board 5 being disposed adjacent the wide end 9 of the board 6 and vice versa. The wearing layer 2 thus formed by the two boards 5 and 6 has a rectangular contour form, one short side of each board forming with one long side face of the board an angle α, a complementary angle of which being substantially equal to the cone angle β of the board.

As previously indicated the wearing layer 2 is on its lower side connected to a second laminar layer 3. This laminar layer is built of a plurality of board pieces 11, the fibre direction of which being oriented more or less transversely to the fibre directions of the wearing layer boards 5 and 6. Thereby the season-dependent swelling and shrinkage of the wood will be counteracted in an effective manner. As connecting means between the wearing layer 2 and the second laminar layer 3 glues of different kinds may advantageously be used. The second laminar layer 3 is in turn on its lower side connected to a third laminar layer 4 built up of boards 12, 13 and 14, the fibres of which being substantially oriented in the same directions as the fibres in the boards 5 and 6 of the wearing layer 2. The boards 12–14 comprised in the third laminar layer—which may with advantage exhibit a more or less tapering form and which may be connected to each other by means of glue layers 15 and 16—serves the purpose to form the supporting portion of the flooring unit. While the different laminar layers 2–4 may be interconnected in such a manner as to make the contour lines of the layers completely coinciding, i.e. in a manner to make the long side faces or edges of the flooring unit totally planar, it may often be advantageous to set off the second laminar layer 3 in a manner shown in FIGS. 1 and 2, that is to say with one edge of the layer 3 projecting a length from the layers 2 and 4 while forming a tongue 17 and with the other edge of the layer 3 somewhat recessed with respect to the layers 2 and 4 while forming a groove 18. Thereby a groove and tongue joint is obtained, by means of which flooring units disposed adjacent each other may be united in an extremely simple manner.

By the fact that the boards 5 and 6 and/or the boards 12–14 exhibit a tapering or conical contour form, conditions are provided for a very effective and rational method for preparing the flooring units, as the contour form of the boards corresponds to the contour form of normally existing tree-trunks. A primary process step in the preparation of the flooring units according to this invention will thus consist in that each of two boards designed for the building up of a laminar layer after their sawing out from a tree-trunk, each are brought to a planar condition along its one long-side face, for example, by sawing, milling and/or planing. Division of the tree-trunks may be accomplished by one single step in a frame saw or similar. This provides a substantial progress from prior art in dividing up boards for flooring units, according to which art it was necessary to saw the tree-trunk in at least two different directions in the frame saws.

As illustrated in FIG. 3, a second preferred process step according to the invention consists in that the two boards 5 and 6 designed for the formation of the wearing layer 2 are connected in a manner wherein the planar long side face of one board 5 is connected to the planar long side face of the second board 6 preferably by a glue joint 19, the narrow end 7 of the board 5 being disposed adjacent the wide end 9 of the board 6. At this time the bark of the boards split in the frame saws may with advantage remain, that is to say it will only be necessary to plane one of the two long side edges of the boards. Thereafter the wearing layer 2 may be connected to the second laminar layer 3, which, as the case may be, is in turn connected to the third laminar layer 4, preferably by gluing, and subsequently the unit thus obtained is given a final, usually rectangular contour form as for example by sawing, milling and/or planning. It is of course not necessary that the second or the third laminar layer exhibits its final form when being glued to the wearing layer 2.

In the final shaping of the flooring units comprised of the different laminar layers the units may either be shaped with a groove and tongue joint 17, 18 on the long sides as well as on the short sides as shown in FIGS. 1 and 2, or may the same be shaped with completely smooth or planar side faces.

The advantages of the new method are obvious by the fact that the frame sawing of the tree-trunks may be accomplished by one single step and that the different laminar layers are first connected whereupon they may be shaped together in substantially one process step. In the inventional floor unit there is further obtained the advantage that the contents of the tree-trunks will be utilized to the utmost while simultaneously the natural beauty of the wood is emphasized.

It is understood that the floor unit described as well as the inventional method may be extensively varied without departing from the idea of the invention as defined in the appended patent claims. In lieu of being comprised of solely two boards, the flooring unit may be assembled of a greater, preferably but not necessarily even number of boards. The flooring unit needs not exhibit a rectangular contour form but it may also with advantage be realized with other geometrical forms, for example square, trapezoidal or similar.

I claim:

1. A method of making a rectangular flooring unit of a laminated construction, said method comprising the steps of cutting timber logs longitudinally of the axes thereof into boards of a generally trapezoidal outline in accordance with natural and original contour form of the logs with cut ends and longitudinal unsawn edges, sawing one longitudinal edge of each of two of the boards to a straight line configuration immediately adjacent to one of the unsawn edges thereof, placing the two boards on at least one backing layer with the narrow end of each of the boards adjacent the wide end of the other board, and with the sawn straight line edges of the boards in opposed abutting relation, bonding the so oriented boards to the backing layer with the unsawn longitudinal edges remote from one another, and finally cutting the assembled unit removing the unsawn longitudinal edges and providing the assembled unit with parallel cut sides.

2. A method according to claim 1, characterized in that the flooring unit is provided with groove and tongue joints, at least along the long side edges of the unit.

3. A method according to claim 1, characterized in that at least two tapering boards with different general widths are combined with each other.

References Cited

UNITED STATES PATENTS

| | | | |
|---|---|---|---|
| 1,444,611 | 2/1923 | Johansson | 52—622 |
| 424,958 | 4/1890 | Clark et al. | 52—313 |
| 2,572,772 | 10/1951 | Skoog | 156—304 |
| 2,582,065 | 1/1952 | Rasor | 156—304 |
| 3,554,850 | 1/1971 | Kuhle | 52—313 |

FOREIGN PATENTS

| | | | |
|---|---|---|---|
| 117,339 | 10/1946 | Sweden | 52—593 |
| 1,243,219 | 8/1946 | France | 23—313 |
| 736,271 | 6/1966 | Great Britain | 144—312 |
| 254,319 | 12/1948 | Switzerland | 144—315 R |

HENRY C. SUTHERLAND, Primary Examiner

U.S. Cl. X.R.

52—615; 144—309 R; 156—300, 304